United States Patent Office 2,955,215
Patented Oct. 4, 1960

2,955,215
SIGNAL MODIFIER

Theodore Eisen, Paramus, Marvin Masel, Hackensack, and Louis Joseph Franchi, New Milford, N.J., assignors to The Bendix Corporation, a corporation of Delaware Filed Oct. 1, 1957, Ser. No. 687,524

7 Claims. (Cl. 307—146)

This invention relates to signal modifying devices for use in automatic control systems to convert signals from one form to a more suitable form for the purpose intended.

Lag networks were used heretofore to modify step command signals in automatic control systems for aircraft. Systems employing lag networks operate satisfactorily in relatively low-speed aircraft, but when used in high-speed aircraft the lag networks are unstable and have proved unsatisfactory.

An object of this invention is to provide a signal modifying system for changing one form of command signal to another form.

Another object is to change a step command signal to a ramp command signal, that is to change an abruptly varying voltage to a gradually changing voltage.

A further object of the invention is to utilize a fixed signal to alter a variable signal in a predetermined manner.

Another object of the invention is to provide a signal modifying system for changing one form of command signal to another form suitable for use in high-speed aircraft control systems.

Another object is to change an abruptly varying voltage to a gradually changing voltage for application to a motor to avoid sudden changes in motor speed or torque output.

The invention contemplates modifying an alternating current signal by a shaped direct current voltage to impress on the alternating current signal the characteristics of the shaped direct current voltage. The direct current voltage gates or limits the alternating current signal in a predetermined manner.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
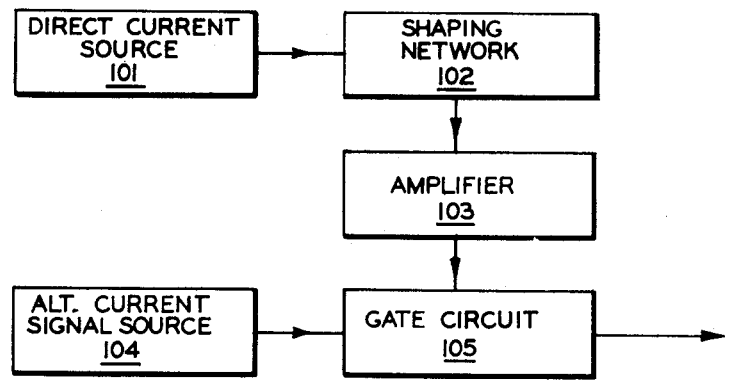
Figure 1 is a block diagram of a signal modifying system constructed according to the invention.

In Figure 1, a direct current voltage from a source 101 is applied to the input of a shaping network 102. The shaped direct current is then amplified to a desirable level by an amplifier 103 connected to the output of network 102. The output of amplifier 103 and an alternating current signal source 104 are connected to a gate circuit 105. The amplified direct current voltage applied to gate circuit 105 by amplifier 103 modifies the signal from source 104 by proportionately limiting the signal at the output of gate circuit 105. The signal at the output of gate circuit 105 is limited in accordance with the amplitude and shape of the direct current voltage from amplifier 103.

Figure 2:
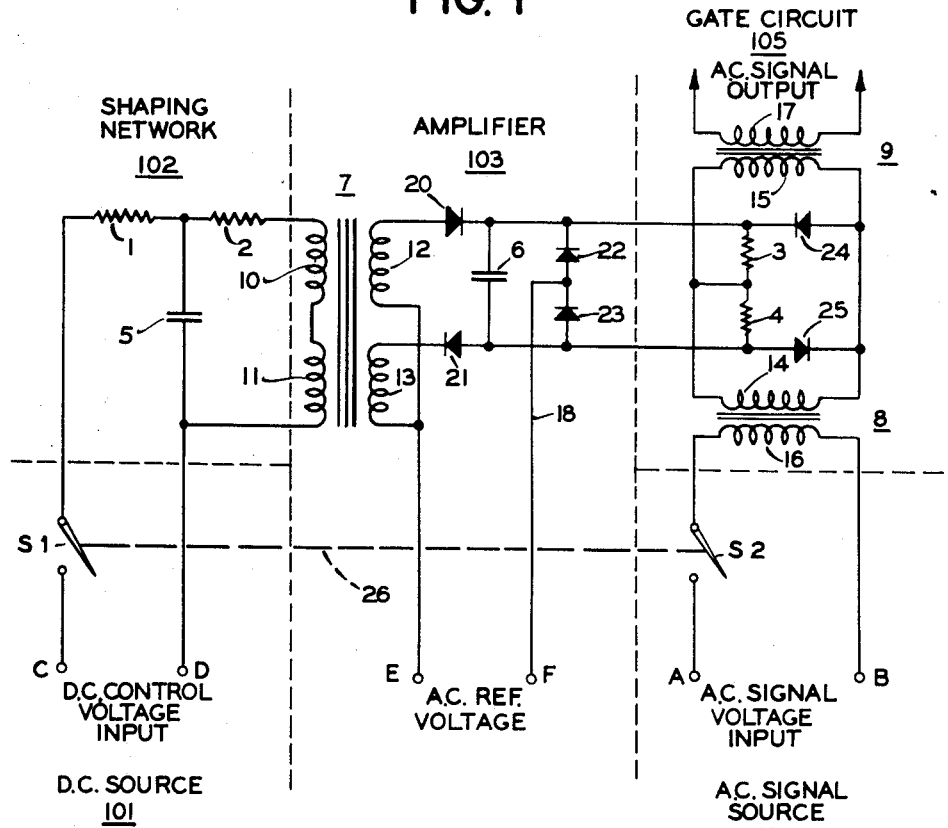
Figure 2 is a schematic diagram of Figure 1.
Figure 4:
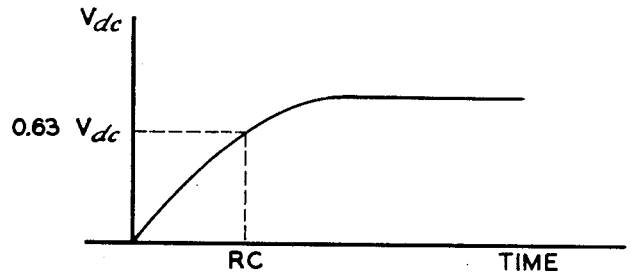

In Figure 2, a switch S1 is connected to a terminal C of direct current source 101 to a pair of series connected resistors 1 and 2. A condenser 5 is connected between the common connection of series connected resistors 1 and 2 and a terminal D of source 101. Resistors 1 and 2 and condenser 5 constitute a voltage shaping network and when connected to source 101 provide an exponentially rising direct current voltage as shown in Figure 4. This voltage is applied across two series connected primary windings 10 and 11 of a saturable reactor 7. Reactor 7 has a pair of secondary windings 12 and 13 each having one end connected to a terminal E of an alternating current reference voltage and their other ends connected by a pair of switching diodes 20 and 21 to opposite sides of a series connected pair of resistors 3 and 4. Diodes 20 and 21 render secondary windings 12 and 13 conductive during alternate half cycles of the reference voltage. A pair of diodes 22 and 23 are connected in series and in the same direction across resistors 3 and 4. A line 18 is connected between the second terminal F of the reference voltage and the common connection point of diodes 22 and 23. A condenser 6 is also connected across resistors 3 and 4 to smooth out the voltage variations.

This arrangement provides a direct current potential across resistors 3 and 4 which is proportional to the shaped potential applied across primary windings 10 and 11 of reactor 7. This potential is utilized in the gate circuit 105 to regulate the signal passed by the gate circuit. A pair of oppositely connected diodes 24 and 25 are connected to opposite ends of resistors 3 and 4 and to one end of a secondary winding 14 of a signal input transformer 8 and to one end of a primary winding 15 of an output transformer 9. The other end of secondary winding 14 and primary winding 15 are each connected to the common connection point of resistors 3 and 4. The diodes 24 and 25 are non-conducting when the potential across resistors 3 and 4 is above a predetermined amplitude.

A switch S2 is connected to a terminal A of alternating current signal source 104 and to one end of a primary winding 16 of transformer 8. The other end of winding 16 is connected to terminal B of source 104. Switches S1 and S2 preferably are connected by linkage 26 for simultaneous operation. With switches S1 and S2 closed, the signal at terminals A and B is applied to primary winding 16 and a shaped direct current voltage from terminals C and D via shaping network 102 and amplifier 103 is applied across resistors 3 and 4 to gate the signal induced in secondary winding 14.

When switch S1 is first closed there is no potential across resistors 3 and 4, as shown in Figure 4, and portions of the signal from signal source 104 are by-passed through diodes 24 and 25 and resistors 3 and 4 from output transformer 9 and no signal current flows in output transformer primary winding 15, but as a potential builds up across resistors 3 and 4, current flows through winding 15. When the potential across resistors 3 and 4 increases to a point where it equals the potential induced in winding 14 none of the signal current is by-passed through diodes 24, 25 and resistors 3, 4 and all the signal current flows through primary winding 15 of output transformer 9. A secondary winding 17 of output transformer 9 provides an output for the signal.

Figure 3:
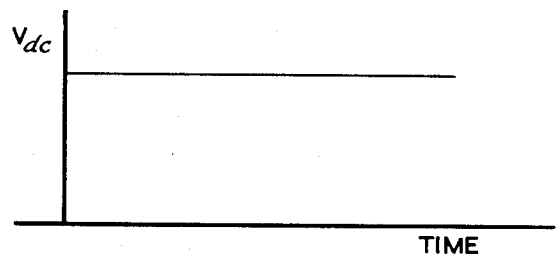
Figures 3 to 6 are curves showing voltages at various points in the system.
Figure 5:
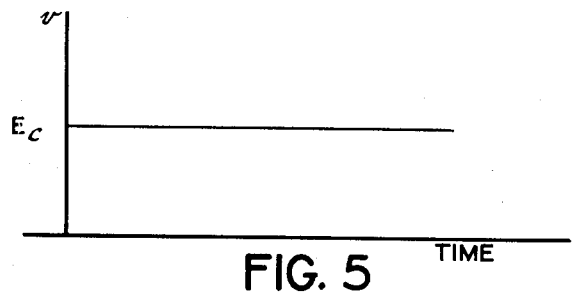
Figure 6:
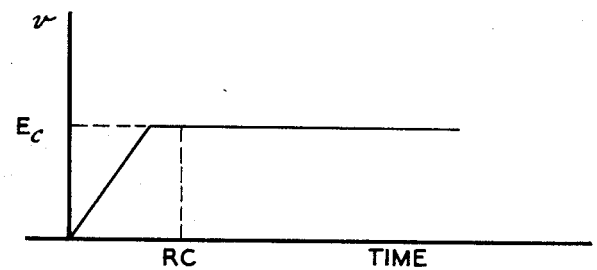

Figure 3 shows the direct current voltage applied to the shaping network 102 and Figure 4 shows the direct current voltage after it has been shaped by network 102. Figure 5 shows the average alternating signal current applied to gate circuit 105 and Figure 6 shows the average alternating signal current at the output of gate circuit 105.

With the arrangement described, the signal may be modified in any desired manner as determined by the shape of the direct current voltage applied to the gating circuit 105. The arrangement described changes an abruptly varying voltage to a gradually changing voltage and is especially adapted for use in high-speed aircraft control systems to avoid abrupt changes in the attitude of the craft.

Although but a single embodiment of the invention has been illustrated and described in detail, it is to be expressly understood that the invention is not limited thereto. As hereinbefore indicated, various changes may also be made in the design and arrangement of the parts without departing from the spirit and scope of the invention as the same will now be understood by those skilled in the art.

We claim:

1. A signal modifying system comprising a source of direct current voltage, a shaping circuit connected to said source for shaping the voltage, an alternating current signal source, and a gating circuit connected to said signal source and to the shaping circuit and controlled by the voltage from the shaping circuit for modifying said alternating current signal in accordance with the voltage from the shaping circuit.

2. A system as defined in claim 1 wherein the shaping circuit includes a resistor and a capacitor to provide an exponentially rising direct current voltage.

3. A signal modifying system comprising a source of direct current voltage, a shaping circuit connected to said source for shaping the voltage, an alternating current signal source, a gating circuit connected to said signal source and including an input and an output connected together, and rectifying means connected in parallel with the output and connected to the shaping circuit to receive the shaped direct current voltage and by-pass portions of the signal from the output as determined by the shape of the shaped direct current voltage.

4. A signal modifying system comprising a source of direct current voltage, a shaping circuit connected to said source for shaping the voltage, an amplifying circuit connected to said shaping circuit for amplifying the direct current voltage, an alternating current signal source, and a gating circuit connected to said signal source and to the amplifying circuit and controlled by the voltage from said amplifying circuit for modifying the signal in accordance with the amplified shaped voltage applied to the gating circuit.

5. The device of claim 4 wherein said amplifying means includes a saturable reactor having a pair of primary windings energized by the shaped voltage and a pair of secondary windings whose impedance varies with the voltage applied to the primary windings, a source of alternating excitation voltage, and rectifying means connecting the source and the windings to provide an amplified shaped direct current voltage for the gating circuit.

6. A signal modifying system comprising a shaping circuit adapted to receive a direct current voltage to shape the voltage in a predetermined manner, and a gating circuit adapted to receive an alternating current signal and connected to the shaping circuit and controlled by the shaped voltage for modifying the alternating current signal in accordance therewith.

7. A signal modifying system comprising a shaping circuit adapted to receive a direct current voltage to shape the voltage in a predetermined manner, and a gating circuit having an input adapted to receive an alternating current signal and having an output, and rectifying means connected between the input and the output and connected to the shaping circuit and receiving the shaped voltage and providing an alternating current signal at the output in accordance with the shaped voltage.

References Cited in the file of this patent

UNITED STATES PATENTS 2,814,737    Sunderlin et al. _____ Nov. 26, 1957